US012689552B2

(12) United States Patent
Smaalders et al.

(10) Patent No.: US 12,689,552 B2
(45) Date of Patent: Jul. 21, 2026

(54) FAILURE DETECTION AND CONTAINMENT

(71) Applicant: Arista Networks, Inc., Santa Clara, CA (US)

(72) Inventors: Bart Smaalders, San Jose, CA (US); Itthichok Jangjaimon, San Jose, CA (US); Pawan Hulyalkar, Fremont, CA (US); Roman Chertov, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 304 days.

(21) Appl. No.: 18/052,001

(22) Filed: Nov. 2, 2022

(65) Prior Publication Data

US 2024/0146602 A1 May 2, 2024

(51) Int. Cl.
| | |
|---|---|
| *H04L 41/069* | (2022.01) |
| *H04L 41/0604* | (2022.01) |
| *H04L 41/0659* | (2022.01) |
| *H04L 41/0663* | (2022.01) |
| *H04L 41/0668* | (2022.01) |
| *H04L 41/0695* | (2022.01) |
| *H04L 41/16* | (2022.01) |

(52) U.S. Cl.
CPC ........ *H04L 41/069* (2013.01); *H04L 41/0604* (2013.01); *H04L 41/0609* (2013.01); *H04L 41/0659* (2013.01); *H04L 41/0663* (2013.01); *H04L 41/0668* (2013.01); *H04L 41/0695* (2013.01); *H04L 41/16* (2013.01)

(58) Field of Classification Search
CPC .............. H04L 41/069; H04L 41/0659; H04L 41/0668; H04L 41/0695; H04L 41/16; H04L 41/0604; H04L 41/0609; H04L 41/0663
See application file for complete search history.

(56) References Cited

U.S. PATENT DOCUMENTS

| | | | | |
|---|---|---|---|---|
| 7,456,736 | B2 * | 11/2008 | Primm | H04L 41/0681 340/3.1 |
| 2011/0149721 | A1 * | 6/2011 | Yang | H04L 43/0817 370/216 |
| 2019/0104024 | A1 * | 4/2019 | Biran | H04L 41/0677 |
| 2019/0394081 | A1 * | 12/2019 | Tahhan | H04L 41/0894 |
| 2020/0204460 | A1 * | 6/2020 | Schneider | H04L 43/20 |
| 2020/0304365 | A1 * | 9/2020 | Bhardwaj | H04L 45/68 |
| 2023/0103056 | A1 * | 3/2023 | Mustafa | H04L 43/0811 709/224 |

FOREIGN PATENT DOCUMENTS

| | | | | | |
|---|---|---|---|---|---|
| CN | 108521340 | B | * | 2/2019 | H04L 43/08 |
| CN | 112763960 | A | * | 5/2021 | G06F 11/079 |
| KR | 20010067488 | A | * | 7/2001 | H04L 45/28 |
| WO | WO-2016026510 | A1 | * | 2/2016 | H04L 41/0631 |

* cited by examiner

*Primary Examiner* — Angela Widhalm De Rodriguez
(74) *Attorney, Agent, or Firm* — Fountainhead Law Group, PC

(57) ABSTRACT

A network device monitors its log files to detect faults. The network device analyzes the faults to determine a failure category that is indicative of the severity of the detected faults. The network device consults a policy that specifies actions to be taken for different failure categories, and invokes the action or actions corresponding to the determined failure category.

20 Claims, 3 Drawing Sheets receive/define categories, 302 receive/define policies, 304 monitor events, 306 identify failure categories, 308 notify failure categories, 310 determine action(s), 312 invoke action(s), 314

FAILURE DETECTION AND CONTAINMENT

BACKGROUND

Reliability is an important consideration in network design. To avoid single points of failure and to handle widely varying loads, critical network functions such as firewalls, routing, etc. can be spread across multiple separate network devices. These devices are often self-organizing to a degree, and in anticipation of failures, use various algorithms to partition the networking task assigned to them amongst the available devices configured to perform that particular function.

The introduction of a new (or return of a previously known component) can generate a disturbance in the network, and this disturbance may affect overall network performance. The same is true when a network device becomes disabled for one reason or another. Such perturbations should be minimized.

Myriad reasons for failures exist, but the common denominator for dealing with them is to attempt to restart the component(s) evidencing the problem in an attempt to rectify the problem. Since Single Event Upsets (SEUs) are not uncommon in complex electronic systems, this is a reasonable approach. This restart may be confined to a particular software component, or it may involve automatic power cycling of the entire network device.

However, for some types of failures, we can expect recurrence of failure. Some failures reoccur at a rate that the network is perpetually reorganizing, either adding or removing the network device. Such recurring failure modes should be avoided to prevent repeated network disturbances caused by such a network device as it attempts to react to and recover recurring failures.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

The present disclosure is directed to the detection of recurring failures in a network device. Recurring failures (crash loops) can disrupt network traffic. As a proactive measure to prevent such disruptive events, embodiments in accordance with the disclosure operate to shut down or otherwise scale back functionality in the network device in response to the detection of recurring failures and other failure modes. Accordingly in accordance with some embodiments, user 142 (e.g., network administrator, manufacturer) can configure network device 100 with failure containment configurations 144 comprising failure category configurations and policies for acting in response to detecting various failure categories. This aspect of the present disclosure is discussed further below.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
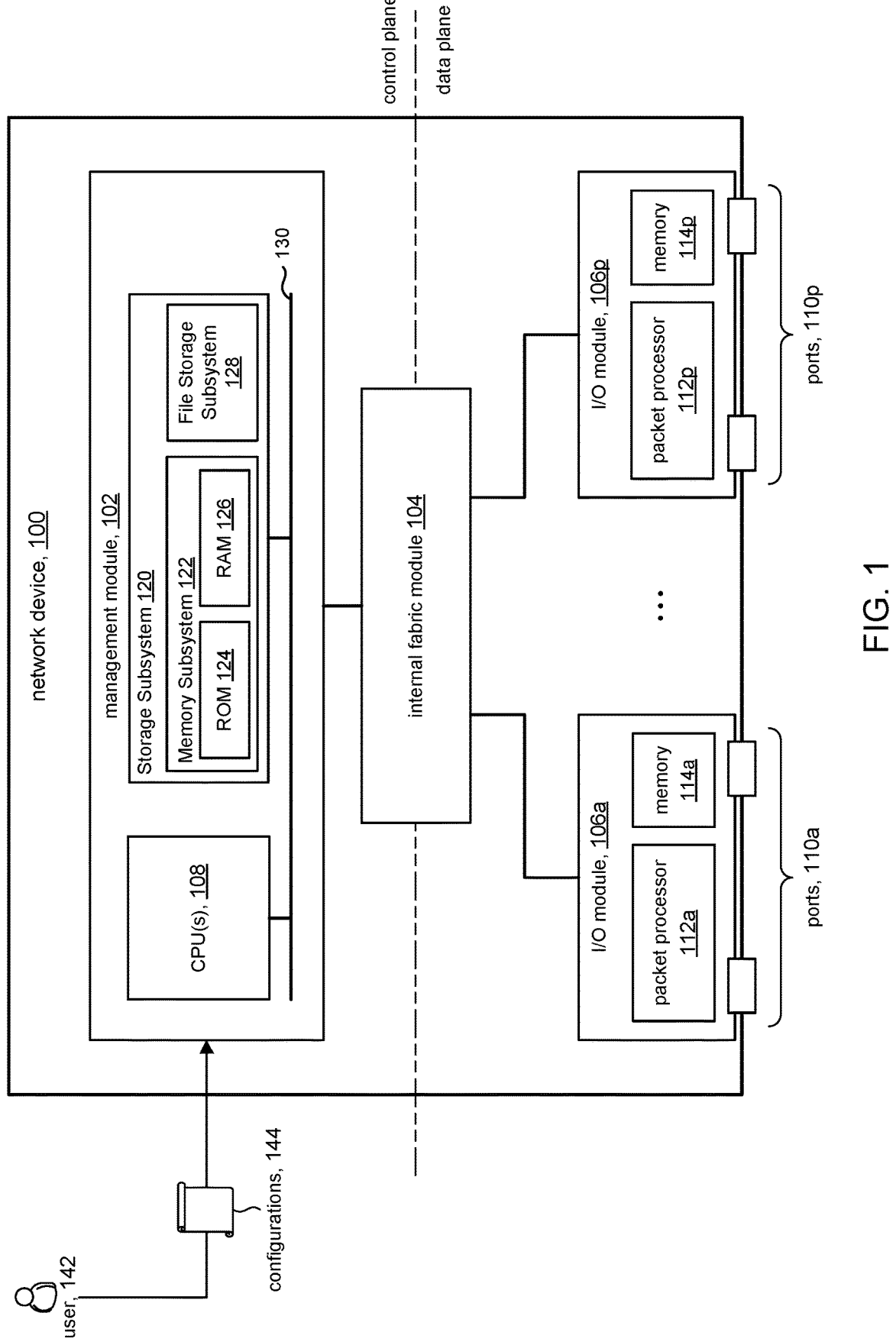
FIG. 1 depicts an example of a network device that can be adapted in accordance with the present disclosure.

FIG. 1 depicts an example of a network device that can be adapted in accordance with the present disclosure. In some embodiments, for example, networking device 100 can include a management module 102, an internal fabric module 104, and a number of I/O modules 106a-106p. Management module 102 can constitute the control plane (also referred to as control layer or simply the CPU) of networking device 100 and can include one or more management CPUs (supervisors) 108 for managing and controlling the operation of networking device 100 in accordance with the present disclosure. Each management CPU 108 can be a general-purpose processor, such as an Intel®/AMD® x86, ARM® microprocessor and the like, that operates under the control of software stored in a memory, such as ROM (read-only memory) 124 or RAM (random-access memory) 126. The control plane provides services that include traffic management functions such as routing, security, load balancing, analysis, and the like.

Management module 102 includes one or more management CPUs 108 that communicate with storage subsystem 120 via bus subsystem 130. Other subsystems, such as a network interface subsystem (not shown in FIG. 1), may be on bus subsystem 130. Storage subsystem 120 includes memory subsystem 122 and file/disk storage subsystem 128, which represent non-transitory computer-readable storage media that can store program code and/or data, which when executed by one or more management CPUs 108, can cause one or more management CPUs 108 to perform operations in accordance with embodiments of the present disclosure.

Memory subsystem 122 includes a number of memories including main RAM 126 for storage of instructions and data during program execution and ROM (read-only memory) 124 in which fixed instructions and data are stored. File storage subsystem 128 can provide persistent (i.e., non-volatile) storage for program and data files, and can include a magnetic hard disk drive, a solid-state drive, and/or other types of storage media known in the art.

One or more management CPUs 108 can run a network operating system stored in storage subsystem 120. A network operating system is a specialized operating system for networking device 100 (e.g., a router, switch, firewall, and the like). For example, the network operating system may be Arista Extensible Operating System (EOS®), which is a fully programmable and highly modular, Linux-based network operating system. Other network operating systems may be used.

Bus subsystem 130 can provide a mechanism for letting the various components and subsystems of management module 102 communicate with each other as intended.

Although bus subsystem 130 is shown schematically as a single bus, alternative embodiments of the bus subsystem can utilize multiple busses.

Internal fabric module 104 and I/O modules 106a-106p collectively represent the data plane of networking device 100 (also referred to as data layer, forwarding plane, etc.). Internal fabric module 104 represents interconnections among the various other modules of networking device 100. Each I/O module 106a-106p can include one or more input/output (ingress/egress) ports 110a-110p that are used by networking device 100 to receive and forward network traffic. Each I/O module 106a-106p can also include packet processing capability, logically represented by respective packet processors 112a-112p and memory components 114a-114p. Packet processors 112a-112p can comprise forwarding hardware, including for example, data processing elements such as an ASIC (application specific integrated circuit), FPGA (field programmable array), digital processing unit, and the like. Memory components 114a-114p can include lookup hardware, including for example, content addressable memory such as TCAMs (ternary CAMs) and auxiliary memory such as SRAMs (static random access memory). The forwarding hardware in conjunction with the lookup hardware can provide wire speed decisions on how to process ingress packets and outgoing packets for egress. In accordance with some embodiments, some aspects of the present disclosure can be performed wholly within the data plane.

Figure 2:
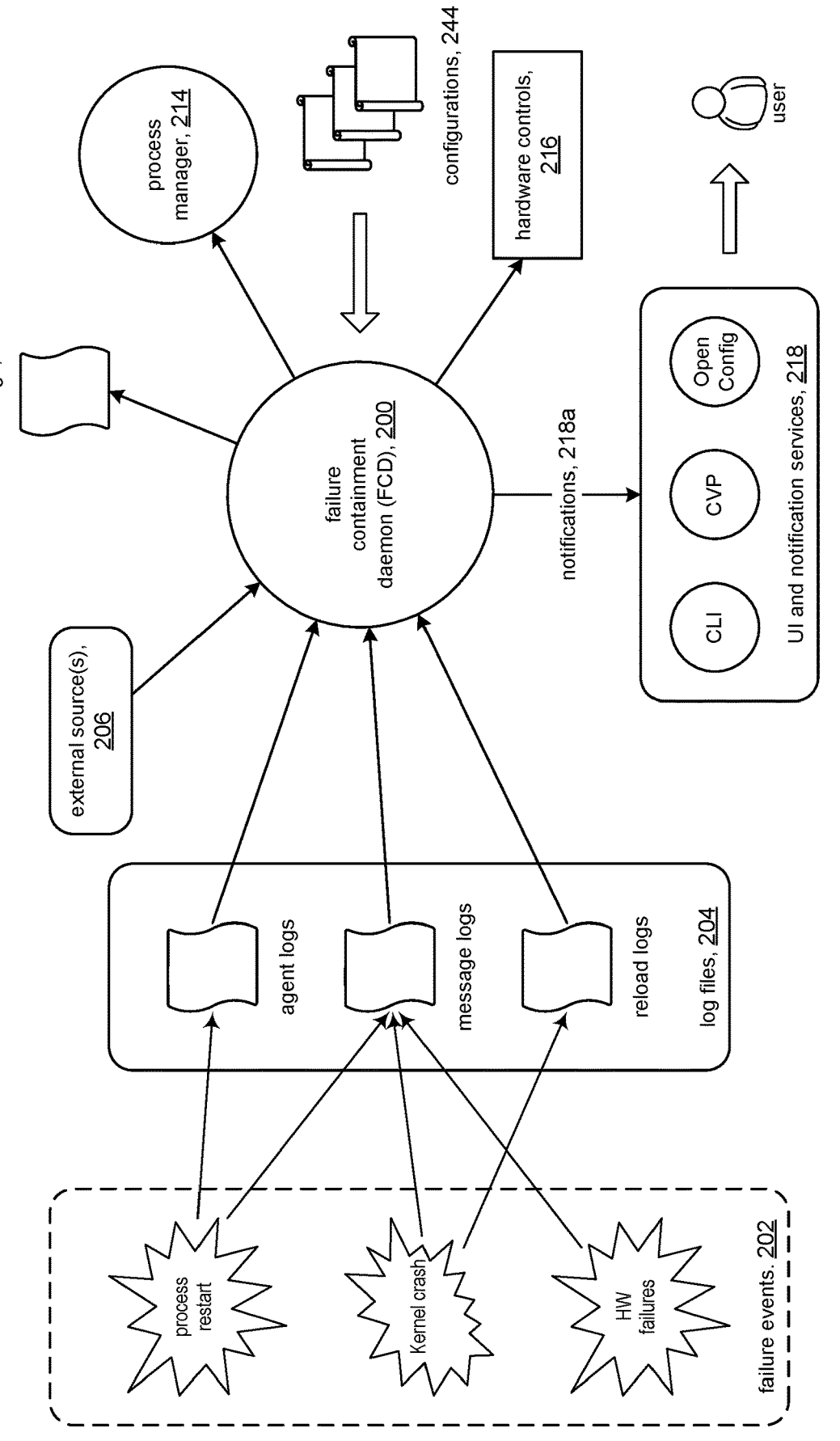
FIG. 2 is a diagrammatic representation of a workflow for proactive containment of failures in accordance with the present disclosure.

FIG. 2 is a diagrammatic representation of a workflow for proactive containment of failures in accordance with the present disclosure. In some embodiments, for example, a failure containment daemon (FCD) 200 that is executed in the network device (e.g., 100) can monitor events and activity in the network device to determine or otherwise detect the presence or occurrence of certain failure modes. In some embodiments, for example, failure events 202 such as process restarts, kernel crashes, hardware failures, and the like can be logged in various log files 204 (e.g., in suitable persistent storage of the network device, in a repository separate from the network device, etc.) and monitored by FCD 200. For example, when a process starts up (e.g., for the first time or is restarted), the process can log information in the agent logs relating to the start up, which can include information such as start time, configuration information, and the like. During execution, the process can log information into a message log in response to detecting errors or other unexpected occurrences. Likewise, when the kernel crashes and restarts, certain information (e.g., time of restart) can be logged in a reload log. Unusual activity detected by the kernel during operation can be logged in the message log. The kernel and processes executing on the kernel can detect hardware component errors or failures (e.g., CPUs, switch cards, power supplies, etc.) and can log those detected errors or failures in the message log.

In addition to these internal software and hardware events, FCD 200 can monitor external sources 206 for events. The external sources can include various external systems, such as other network devices, a network controller, etc. These external systems can provide a more comprehensive view of the network and its constituent devices. The external system can notify FCD 200 of problematic devices.

FCD 200 can analyze or otherwise assess the monitored information to identify certain categories of failure. The results can be logged in a failure log 212 and various actions can be taken. In some embodiments, FCD 200 can signal or otherwise instruct process manager 214 in the network device to alter the functionality of the network device in response to the occurrence of certain failures by reconfiguring one or more processes executing on the network device. Likewise, FCD 200 can adjust various hardware controls (e.g., via hardware controller 216) on the network device to alter the functioning of the network device. FCD 200 can push notifications 218a to a user (e.g., network administrator) via UI and notification services 218 executing on the network device.

Failure containment configurations 244 can comprise configuration information that defines failure categories and failure containment policies that specify actions to be taken for each failure category. Failure categories can be closely tied to internal processes and hardware events. Information (e.g., contents of the log files 204) from such internal processes and hardware events may not be accessible to or readily comprehensible by the user. Accordingly, in some embodiments, the failure categories themselves and the information used to determine the failure categories can be predefined by the manufacturer of the network device. Policies that dictate what actions should be taken for a given failure category, on the other hand, can be specified by the user such as a network administrator.

Figure 3:
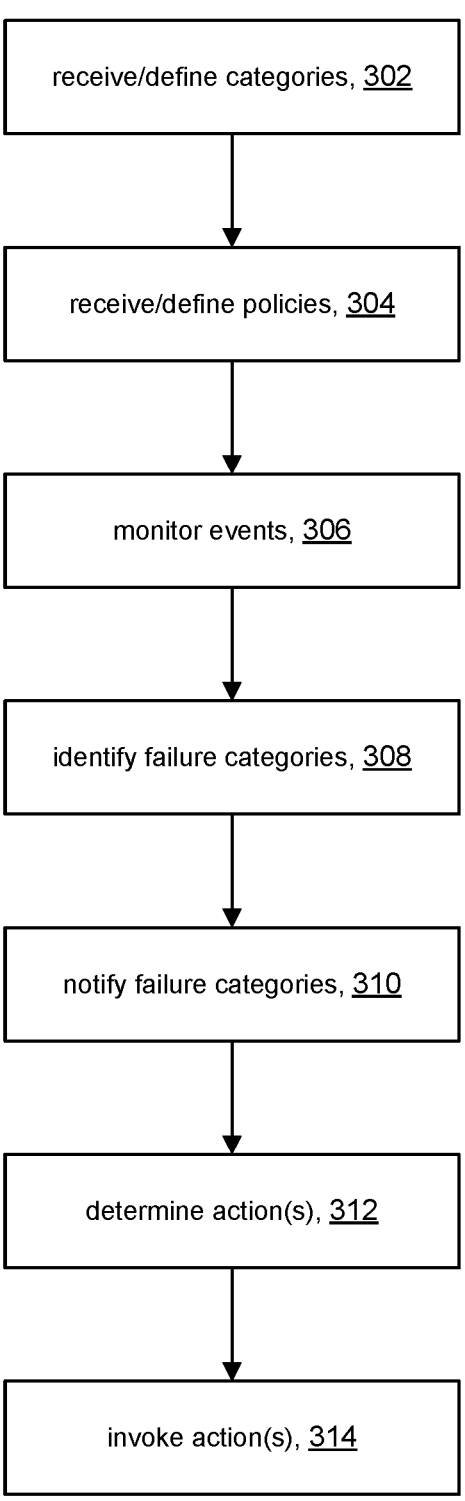
FIG. 3 shows a high-level description of a workflow for a network device to provide proactive failure containment in accordance with the present disclosure.

Referring to FIG. 3, the discussion will now turn to a high-level description of a workflow for a network device (e.g., 100, FIG. 1) to provide proactive failure containment in accordance with the present disclosure. In some embodiments, for example, the network device can include one or more digital processing units, which when operated, can cause the network device to perform processing in accordance with FIG. 3. Digital processing units can include general CPUs in the control plane of the network device that operate by way of executing computer program code stored on a non-volatile computer readable storage medium (e.g., read-only memory); for example, CPU 108 in the control plane (FIG. 1) can be a general CPU. Digital processing units can include specialized processors in the data plane of the network device, such as digital signal processors, field programmable gate arrays, application specific integrated circuits, and the like, that operate by way of executing computer program code or by way of logic circuits being configured for specific operations. For example, packet processors 112a-112p in the data plane (FIG. 1) can be a specialized processor.

Generally, in accordance with some embodiments, FCD 200 can monitor various sources (e.g., agent logs, message logs, reload cause logs, external sources, etc.) logged by software components in the network device. The FCD can then classify the errors into various failure categories and initiate certain actions based on one or more of the identified failure categories.

At operation 302, the network device can receive/define failure categories. In some embodiments, failure categories can be defined by the manufacturer of the network device. As noted above, the criteria for failure categories can be based on internal operating states (software and hardware) and other internal information that are not readily accessible by an end-user of the network device. Accordingly, the failure categories can be pre-programmed or otherwise configured in the network device during manufacture or by the manufacturer at the time the switch is deployed. It will be appreciated, however, that configuring the network device with failure categories is not limited to the manufacturer; in some embodiments, for example, the user can configure/define failure categories.

Failure categories can be determined based on the operational impact of certain errors or faults in the network device, frequency of occurrence of errors, and so on. Merely to illustrate, and for discussion purposes, consider the following non-exhaustive list of failure categories:

Category 1—This failure category represents faults/failures that are deemed critical to device functionality. A non-exhaustive list of examples can include:

A CPU error on a single CPU network device has repeatedly panic'd the kernel.

A switch card with network ports keeps failing.

Critical software components fail repeatedly, causing link flapping.

Category 2—This failure category represents faults/failures that degrade operation of the device (e.g., reduces quality of service). A non-exhaustive list of examples can include:

A CPU error on a dual CPU network device has repeatedly panic'd its kernel; operation in single supervisory mode is possible.

Critical software components fail repeatedly but do not cause immediate network impact. Other network events in combination with this failure might impact network performance.

Category 3—This failure category represents faults/failures that may disable certain functionality but otherwise does not impede the processing of network traffic. A non-exhaustive list of examples can include:

A particular user interaction causes a crash.

Off-line logging is unavailable, so has been automatically disabled.

Non-essential software components are failing repeatedly.

It will be appreciated that other categories can be defined.

At operation 304, the network device can receive/define one or more failure containment policies. In some embodiments, for example, a policy can be provided by a user (e.g., network administrator) and in other embodiments by an automated process (e.g., network controller). The failure containment policy specifies what action(s) to take in response to the occurrence of certain failure categories. Although the network device may be configured with several policies, in some embodiments, one policy is active at a time.

At operation 306, the network device, and in particular the failure containment daemon (FCD), can monitor events that occur during operation of the network device. In some embodiments, for example, the FCD can read in or otherwise collect information from the various log files (e.g., logs 204) and other sources (e.g., external source 206). The FCD can identify failure information based on the received information. In some embodiments, the type of data that the FCD collects and/or analyzes can be driven by the failure categories that are configured in the network device.

At operation 308, the FCD can identify failure categories. In some embodiments, for example, the FCD can apply heuristics, rule-based analysis, or any other suitable analytical techniques to the identified failure information to identify and categorize failure modes. Failure classification can take into account hardware and software configurations of the network device to ensure that the containment is not overly aggressive. For example, some network devices have redundant hardware components such as supervisory CPUs and memory. A persistent CPU cache error, for example, could entirely disable a network device without a redundant supervisor in which case the occurrence of such error may be a Category 1 error. On the other hand, the error in a device configured with dual supervisors could continue to operate, albeit at a reduced reliability level, and so the error may be a Category 2 error. The same variability is true for various software errors. Errors in software components responsible for programming the LEDs on the front panel can safely be ignored (e.g., classified as Category 3) while faults in software components responsible for programming the routing hardware may be deemed to be unacceptable and may be classified as Category 1.

In some embodiments, the FCD can track the history of certain faults/events (e.g., CPU reboots) and determine failure categories based on the historical data. For example, if the FCD sees that the CPU has rebooted n number of times within a given period of time, that observation can represent the occurrence of a Category 1 failure.

Some additional considerations that can be incorporated in determining a failure category can include, but are not limited to:

Category 1 events having immediate impact on the network—Links in a network device continually going down, the network device continually rebooting, and the like can have an immediate impact on the network in that neighboring switches can immediately detect such failures as a "change" in the network and react to such change. This can have a cascading effect as adjacent switches react to the change, which can be exacerbated by repeated occurrences of the failure.

In some embodiments, a user (e.g., network administrator) can configure/define parameters that define what constitutes "continuous"; for example, the occurrence of n failures within say t minutes of time.

Category 2 events that do not have immediate impact on the network—Some failures may not have an immediate impact on the network. For example, a protocol agent execution on the network device that runs a protocol such as STP (Spanning Tree Protocol) or OSPF (Open Shortest Path First) may periodically become unhealthy (e.g., lose some of its state information) or crash. The impact may not be immediate or immediately apparent because unless a network event happens that causes a change in the topology, all network traffic follows the correct route. The unhealthy agent may not respond to the change in network topology in time and that could cause loss of traffic.

This can be detected, for example, based on information in logs files showing that a protocol agent rebooted some number of times (e.g., 5 times) within a period of time (e.g., 30 minutes). The information can include predefined log messages that indicate some internal error state of the agent.

Category 3 events that do not impact the network but can impact access to the network device, maintenance of the network device, and the like—For example, a configuration agent may periodically crash, making it difficult to configure the network device. A CLI (command line interface) agent may crash, making it difficult to access the network device. These failures impact the usability of the network device itself, but do not necessarily have an impact on the network.

At operation 310, the FCD can push notifications in response to detecting a failure category. In some embodiments, identified failures can be logged (e.g., in failure logs 212) for further analysis. In some embodiments, the FCD can push notifications to the user. For example, the network device can include notification services (e.g., 218) that the FCD can use to notify the user of failure occurrences. The user-end workflow can include assigning the identified failure to a user. The user can then access the network device to retrieve failure logs and other information to troubleshoot and fix the issue(s), e.g., replace a line card. The user can then re-enable the network device to full operating mode, e.g., by rebooting the network device, re-enabling certain functionality, and so on.

At operation 312, the FCD can determine action(s) to take in response to an identified failure category. Any suitable action or actions can be taken to contain the failure/fault in such a way so as to avoid affecting network performance and stability. In some embodiments, for example, the actions can be determined based on the failure containment policy received and configured on the network device. The action(s) can change the level of functionality in the network device in response to the identified failure category from a fully functional device to a non-functioning device. Merely for illustration purposes, a policy may express the following actions to take:

For some Category 1 failures (e.g., CPU error), the action can be to turn off network devices. This case represents an example of a non-functioning network device. By turning off the network device the severe nature of the failure is not able to disrupt the network.

For some Category 1 failures (e.g., a supervisor CPU fails), when the network device is configured with dual supervisors, the action can be to force a switchover all control plane activity to the surviving supervisor. This case represents an example of a reduced functioning network device; instead of having both supervisors active, only one remains active to provide control plane functionality which can result in reduced control plane functionality.

For failures in other categories (e.g., Category 2 and Category 3), the action can be to force the network device to operate in an "isolate" mode, where the FCD disables (e.g., via process manager 214) all services except for those services used for failure analysis and recovery. This case represents another level of reduced functionality in that not all the functions in the network device are available.

In some embodiments, the network device can respond to a Category 3 failure by pushing a notification, but otherwise take no other action on the network device. For example, the fault may be that some front panel LEDs (light emitting diodes) are not working, but the network device is otherwise able to process network traffic. In this example a "change" in the level of functionality in the network device comprises only sending the notification.

It will be appreciated that other actions are possible. A policy can be more granular, for example, by specifying action(s) for each failure category.

At operation 314, the FCD can invoke the one or more actions per the policy to alter the level of functionality of the network device. For example, if the action is to turn off the network device, the FCD can communicate with a hardware controller (e.g., 216) to turn off the network device.

In some embodiments, the network device can be configured to operate in a low memory mode for some failure categories, where certain processes/services are terminated to save on memory. In low memory mode, enough services can remain so that network traffic can still be processed.

In some embodiments, the network device can be configured to operate in an "isolate" mode for some failure categories, where the network device operates with reduced functionality. For example, the FCD can notify process manager 214 to terminate most of the processes/services executing on the network device (e.g., terminate network traffic processing), except those services that allow a user to access and troubleshoot the device; e.g., UI or other interface services, access to a database, and so on. In isolate mode, the network device is "up" but is otherwise not processing network traffic (data plane functionality is disabled). Isolate mode can maintain control plane functionality so that users can locally and/or remotely access the network device to pull the logs, look at hardware registers, and so on to troubleshoot the network device. In some embodiments, control plane functionality that relates to network operation (e.g., STP learning, ARP, etc.) can be disabled.

It will be appreciated that in other embodiments, the network device can be configured with additional operating modes. A failure containment policy can switch to these additional operating modes depending on the nature of the failure category.

FURTHER EXAMPLES

Features described above as well as those claimed below may be combined in various ways without departing from the scope hereof. The following examples illustrate some possible, non-limiting combinations:

(A1) A method for error handling in a network device, the method comprising: receiving and storing at least one failure response policy in the network device, the at least one failure response policy comprising a plurality of failure categories and one or more corresponding actions for each failure category; monitoring log files; determining a failure category from among the plurality of failure categories using information contained in the log files; and performing one or more actions based on the failure category in accordance with the at least one failure response policy.

(A2) For the method denoted as (A1), the log files are stored in the network device.

(A3) For the method denoted as any of (A1) through (A2), determining a failure category is based on occurrence of errors or faults in the network device and/or frequency of errors or faults in the network device.

(A4) For the method denoted as any of (A1) through (A3), determining a failure category includes applying one or more of heuristics and rule-based analysis on the errors or faults in the network device, and/or the frequency of errors or faults in the network device.

(A5) The method denoted as any of (A1) through (A4), further comprising receiving and storing definitions of the plurality of failure categories in the network device.

(A6) The method denoted as any of (A1) through (A5), further comprising monitoring external information from sources external to the network device, wherein determining a failure category includes using the external information.

(A7) For the method denoted as any of (A1) through (A6), the one or more actions include one or more of turning off the network device and disabling network functions in the network device but retaining user interface functions in the network device.

(A8) For the method denoted as any of (A1) through (A7), the one or more actions includes only sending a notification to a user.

(B1) A network device comprising: one or more computer processors; and a computer-readable storage medium comprising instructions. The computer instructions for controlling the one or more computer processors to:

receive one or more failure response policies, each failure response policy comprising a plurality of failure categories and one or more corresponding actions for each failure category; detect occurrence of events in the network device; determine a failure category from the detected events; use at least one of the one or more failure response policies to identify one or more action associated with the failure category; and perform the one or more identified actions.

(B2) For the network device denoted as (B1), the computer-readable storage medium further comprises instructions for controlling the one or more computer processors to monitor one or more log files stored on the network device and monitor external information from sources external to the network device, wherein determining a failure category includes using information contained in the one or more log files and the external information.

(B3) For the network device denoted as any of (B1) through (B2), the one or more identified actions include one or more of forcing a switchover from a primary control plane supervisor to a secondary control plane supervisor, turning off the network device, disabling data plane functionality in the network device, and maintaining one or more control plane functions.

(B4) For the network device denoted as any of (B1) through (B3), the one or more actions includes only sending a notification to a user.

(B5) For the network device denoted as any of (B1) through (B4), to determine a failure category is based on occurrence of errors or faults in the network device and/or frequency of errors or faults in the network device.

(B6) For the network device denoted as any of (B1) through (B5), to determine a failure category includes applying one or more of heuristics and rule-based analysis on the errors or faults in the network device and/or the frequency of errors or faults in the network device.

(C1) A method in a network device, the method comprising: receiving at least one failure response policy, the failure response policy comprising a plurality of failure categories, wherein each failure category is associated with a level of functionality of the network device; detecting occurrence of events in the network device; determining a failure category from the detected events; and adjusting functioning of the network device in accordance with the failure response policy to a level of functionality corresponding to the determined failure category.

(C2) The method denoted as (C1), further comprising accessing one or more log files stored on the network device, wherein the detected events are based on information contained in the one or more log files.

(C3) The method denoted as any of (C1) through (C2), further comprising monitoring external information from sources external to the network device, wherein determining a failure category includes using the external information.

(C4) For the method denoted as any of (C1) through (C3), adjusting functioning of the network device includes one or more of turning off the network device, disabling data plane functionality in the network device, and maintaining one or more control plane functions.

(C5) For the method denoted as any of (C1) through (C4), adjusting functioning of the network device includes only sending a notification to a user.

(C6) For the method denoted as any of (C1) through (C5), determining a failure category is based on occurrence of errors or faults in the network device and/or frequency of errors or faults in the network device and includes applying one or more of heuristics and rule-based analysis on the errors or faults in the network device and/or the frequency of errors or faults in the network device.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for error handling in a network device comprising a data plane configured to receive and forward network traffic, the method comprising:

receiving and storing, by the network device, at least one failure response policy in the network device, the at least one failure response policy comprising a plurality of failure categories and one or more corresponding actions for each failure category, the plurality of failure categories including a first failure category that comprises failures deemed critical to the network device's functionality and a second failure category comprising failures that are not deemed critical to the network device's functionality but degrade operation of the network device;

monitoring, by the network device, log files;

determining, by the network device, a failure category from among the plurality of failure categories using information contained in the log files; and performing, by the network device, one or more actions on the network device based on the failure category in accordance with the at least one failure response policy, wherein upon determining the first failure category, the one or more actions include turning the network device off, and wherein upon determining the second failure category, the one or more actions include entering a mode that disables network traffic processing in the data plane but maintains control plane functionality of the network device.

2. The method of claim 1, wherein the log files are stored in the network device.

3. The method of claim 1, wherein determining a failure category is based on occurrence of errors or faults in the network device and/or frequency of errors or faults in the network device.

4. The method of claim 3, wherein determining a failure category includes applying one or more of heuristics and rule-based analysis on the errors or faults in the network device, and/or the frequency of errors or faults in the network device.

5. The method of claim 1, further comprising receiving and storing definitions of the plurality of failure categories in the network device.

6. The method of claim 1, further comprising monitoring external information from sources external to the network device, wherein determining a failure category includes using the external information.

7. The method of claim 1, wherein the one or more actions includes only sending a notification to a user.

8. The method of claim 1 wherein the data plane of the network device includes forwarding hardware and lookup hardware that provide wire speed decisions on how to process incoming and outgoing network packets.

9. A network device comprising:

a data plane configured to receive and forward network traffic;

a control plane configured to enable management and configuration of the network device;

one or more computer processors; and a computer-readable storage medium comprising instructions for controlling the one or more computer processors to:

receive one or more failure response policies, each failure response policy comprising a plurality of failure categories and one or more corresponding actions for each failure category, the plurality of failure categories including a first failure category that comprises failures deemed critical to the network device's functionality and a second failure category comprising failures that are not deemed critical to the network device's functionality but degrade operation of the network device;

detect occurrence of events in the network device;

determine a failure category from the detected events;

use at least one of the one or more failure response policies to identify one or more actions associated with the failure category; and perform the one or more actions on the network device, wherein in response determining the first failure category, the one or more actions including turning off the network device, and wherein in response to determining the second failure category, the one or more actions include entering a mode that disables network traffic processing in the data plane but maintains operation of the control plane.

10. The network device of claim 9, wherein the computer-readable storage medium further comprises instructions for controlling the one or more computer processors to monitor one or more log files stored on the network device and monitor external information from sources external to the network device, wherein determining a failure category includes using information contained in the one or more log files and the external information.

11. The network device of claim 9, wherein the one or more actions includes only sending a notification to a user.

12. The network device of claim 9, wherein to determine a failure category is based on occurrence of errors or faults in the network device and/or frequency of errors or faults in the network device.

13. The network device of claim 12, wherein to determine a failure category includes applying one or more of heuristics and rule-based analysis on the errors or faults in the network device and/or the frequency of errors or faults in the network device.

14. The network device of claim 9 wherein the data plane of the network device includes forwarding hardware and lookup hardware that provide wire speed decisions on how to process incoming and outgoing network packets.

15. A method in a network device comprising a data plane configured to receive and forward network traffic, the method comprising:

receiving, by the network device, at least one failure response policy, the failure response policy comprising a plurality of failure categories, wherein each failure category is associated with a level of functionality of the network device, and wherein the plurality of failure categories includes a first failure category that comprises failures deemed critical to the network device's functionality and a second failure category comprising failures that are not deemed critical to the network device's functionality but degrade operation of the network device;

detecting, by the network device, occurrence of events in the network device;

determining, by the network device, a failure category from the detected events; and adjusting, by the network device, functioning of the network device in accordance with the failure response policy to a level of functionality corresponding to the determined failure category, wherein upon determining the first failure category, the adjusting comprises turning the network device off, and wherein upon determining the second failure category, the adjusting comprises entering a mode that disables network traffic processing in the data plane but maintains control plane functionality of the network device.

16. The method of claim 15, further comprising accessing one or more log files stored on the network device, wherein the detected events are based on information contained in the one or more log files.

17. The method of claim 16, further comprising monitoring external information from sources external to the network device, wherein determining a failure category includes using the external information.

18. The method of claim 15, wherein adjusting functioning of the network device includes only sending a notification to a user.

19. The method of claim 15, wherein determining a failure category is based on occurrence of errors or faults in the network device and/or frequency of errors or faults in the network device and includes applying one or more of heuristics and rule-based analysis on the errors or faults in the network device and/or the frequency of errors or faults in the network device.

20. The method of claim 15 wherein the data plane of the network device includes forwarding hardware and lookup hardware that provide wire speed decisions on how to process incoming and outgoing network packets.

* * * * *